Patented June 1, 1954

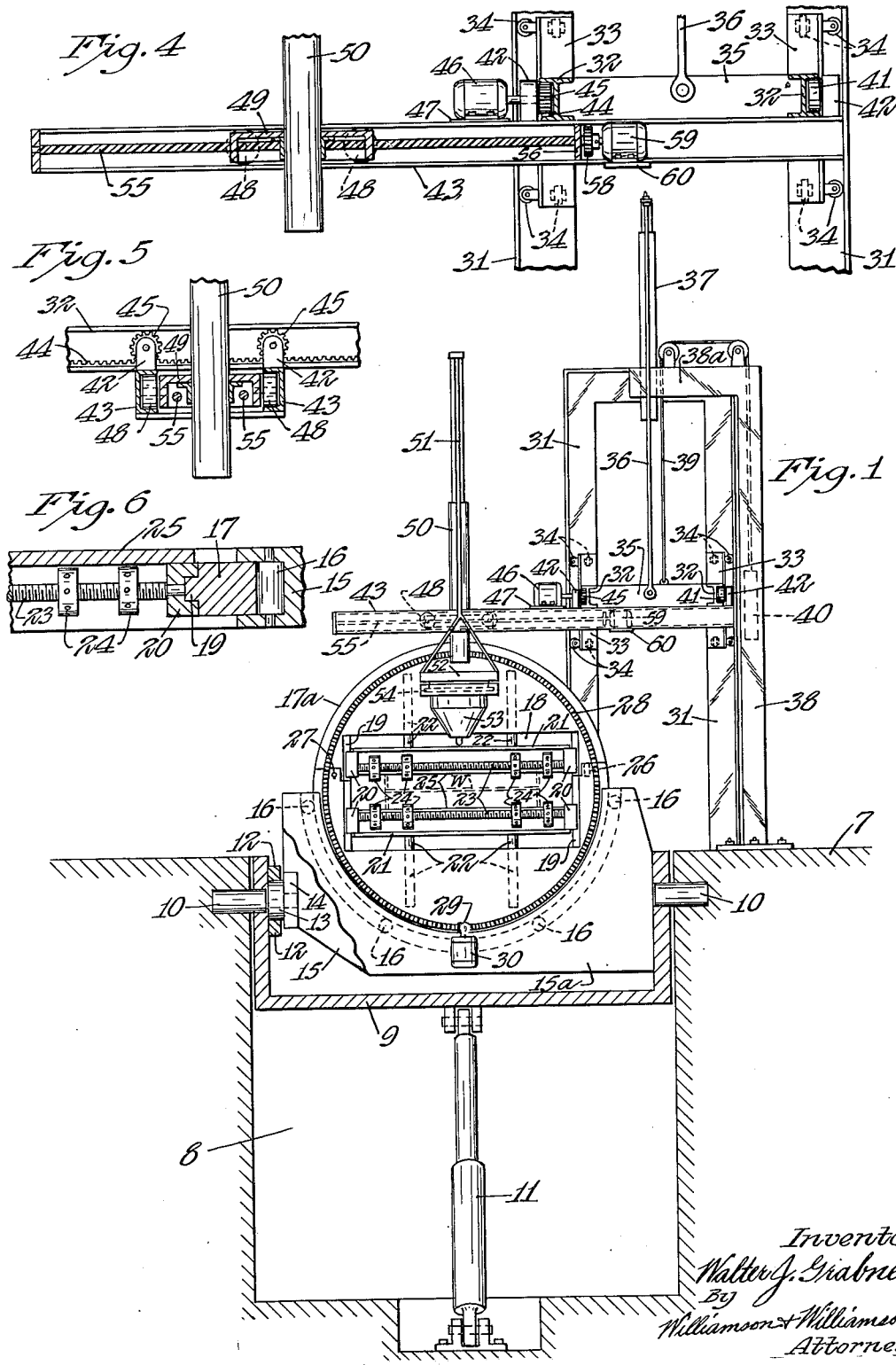

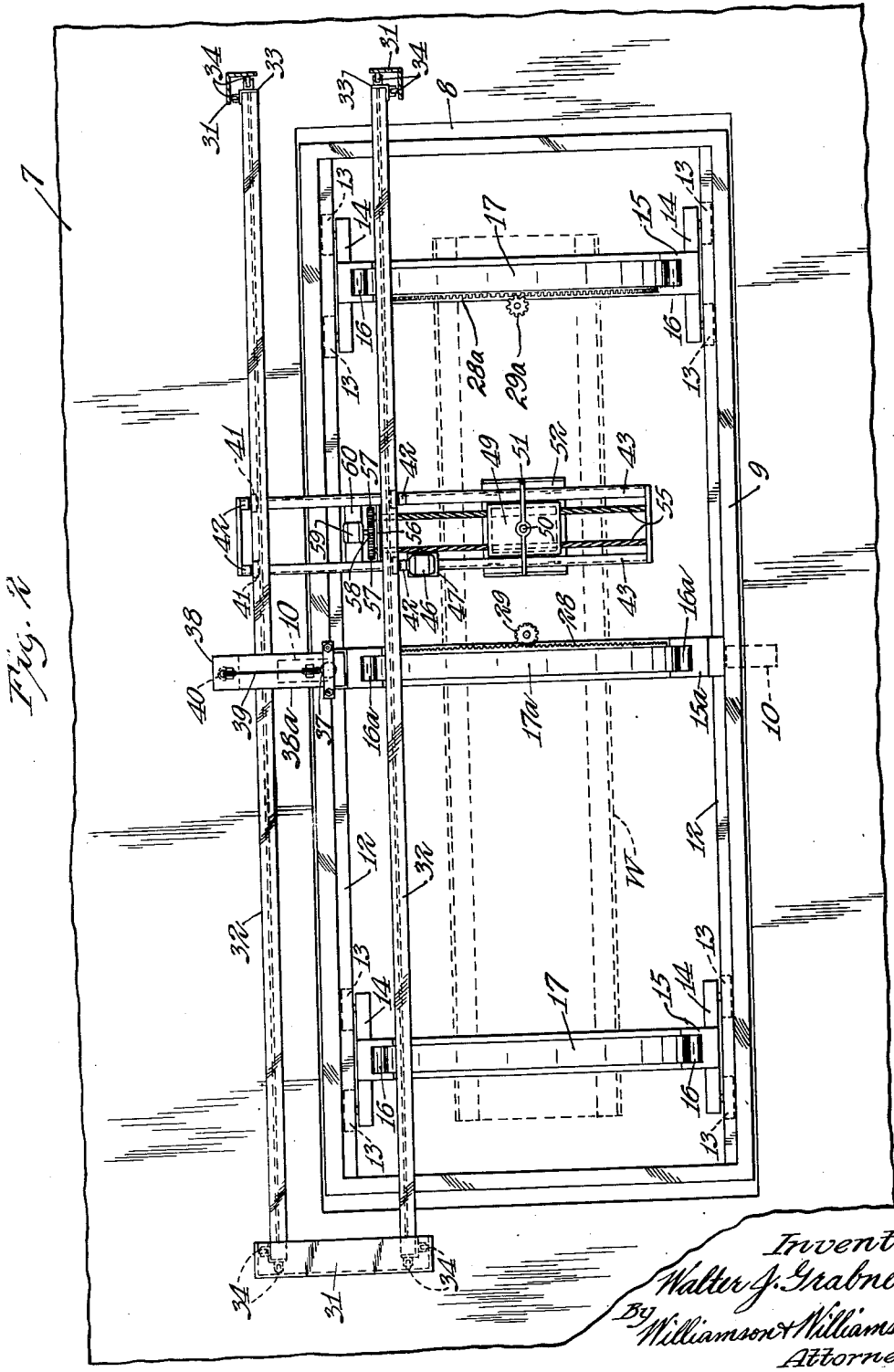

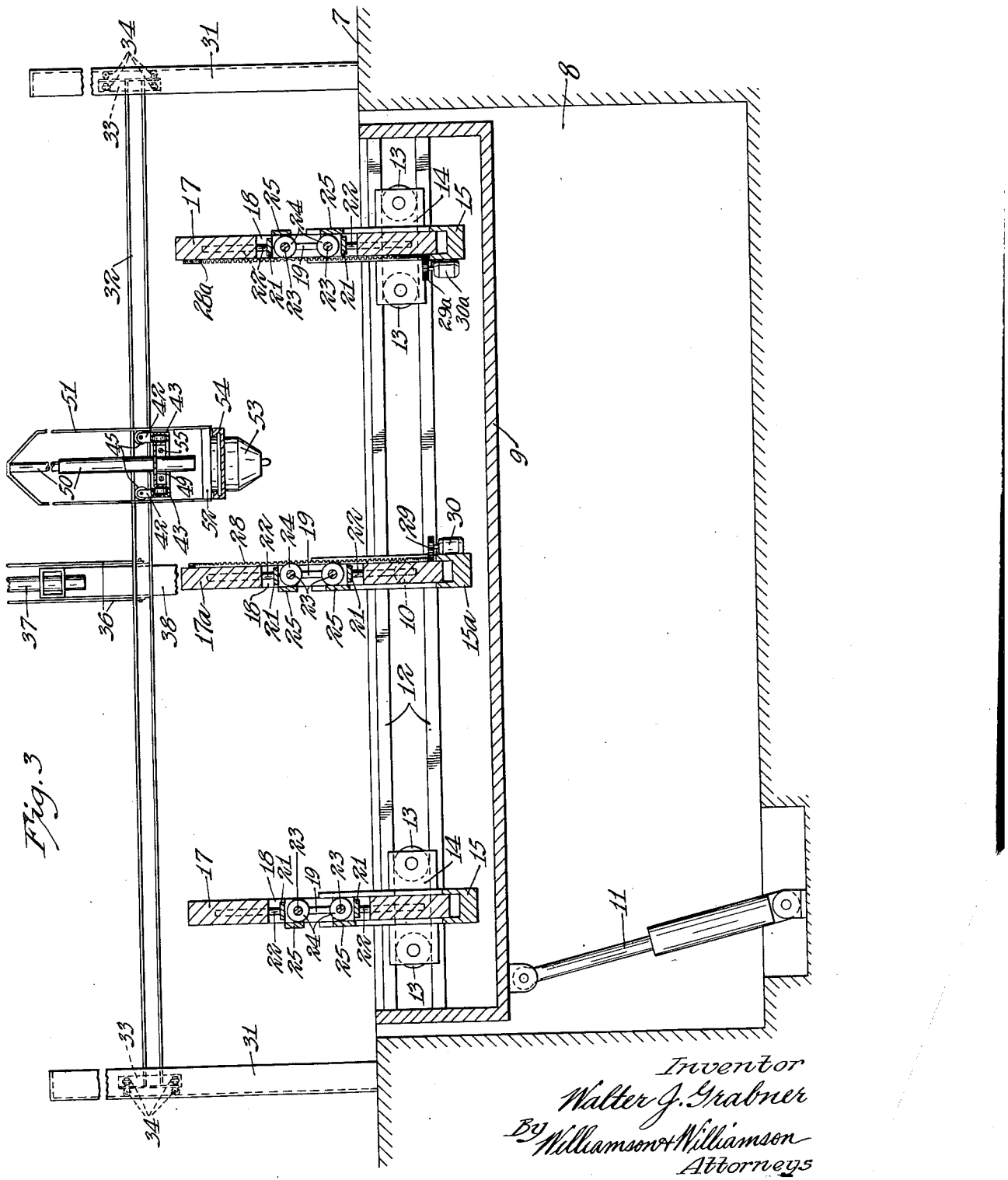

2,679,817

UNITED STATES PATENT OFFICE 2,679,817

WORK HOLDING AND FABRICATING APPARATUS

Walter J. Grabner, Minneapolis, Minn.

Application October 8, 1949, Serial No. 120,406

9 Claims. (Cl. 113—59)

This invention relates to work holding and fabricating apparatus which is principally designed for use in various operations performed on structural elements which are of considerable size and weight. The apparatus is useful in numerous fields, and one of the principal uses therefor is in fabricating large structural units made up of multiple pieces which are united by welding. However, it can be used for cutting large pieces of work with a torch or a saw. It is also useful in connection with a milling machine and it can be used for riveting or bolting operations and any other operations requiring holding or clamping of the work when fabricating materials. Another feature is the ability to bend or twist the work to straighten it where necessary.

It is a general object of the invention to provide work supporting and fabricating apparatus which can be manipulated with the work or auxiliary work holding frames clamped thereon so that the work can be held in different angular positions and also turned over to present the underside of the work uppermost to facilitate the required operations on the work, without unclamping or disturbing the work.

More particularly it is an object of the invention to provide work holding and fabricating apparatus including an elongated frame which is tiltable about a horizontal transverse axis and a cooperating frame portion supported thereby which is rotatable about an axis substantially normal to the first mentioned axis of tilt.

A further object of the invention is to provide frame work movable as stated above and also to provide efficient work clamping or gripping means which will effectively secure the work so that it can be tilted or rotated to different positions and securely held when moved to such positions.

Another object is to provide apparatus whereby work can be bent or straightened.

These and other objects and advantages of the invention will more fully appear from the following description made in connection with the accompanying drawings, wherein like reference characters refer to the same parts throughout the views, and in which Fig. 1 is a transverse vertical section through the apparatus with a portion thereof broken away;

Fig. 2 is a plan view of the apparatus with parts in section;

Fig. 3 is a longitudinal vertical sectional view with a portion of the tool holder and its support broken away;

Fig. 4 is an enlarged fragmentary section through a part of the tool holder support;

Fig. 5 is an enlarged fragmentary view partly in section of another portion of the tool holder support; and Fig. 6 is an enlarged fragmentary section through a portion of the rotatable work clamping means.

In Figs. 1, 2 and 3, there is shown a portion of a floor 7 in which is formed a pit 8. A main frame 9 is mounted in the pit 8 on suitable pivots 10 which are shown in Fig. 1. A hydraulic ram 11 is connected between the bottom of the frame 9 and the floor of the pit 8, it being seen in Fig. 3 that the connection with the frame 9 is at an end of said frame so that actuation of the ram 11 will tilt said frame about its pivots 10. Extending along the inner side walls of the frame 9 are guides 12 which are adapted to receive rollers 13 which are suitably journaled in plates 14. The plates 14 in turn are connected to transversely disposed bearing members 15 which are journaled to receive spaced bearing elements 16. Resting upon each set of bearings 16 is one of two wheel-like structures 17. As shown in Figs. 2 and 3, there is a wheel-like structure 17 disposed adjacent either end of the frame 9, and said wheel-like structures 17 can be moved along the guideways 12 toward and away from each other. There is a centrally disposed transverse bearing member 15a which is rigidly secured between the sides of the frame 9 and said bearing member 15a is provided with bearings 16a to support a central wheel-like structure 17a which is constructed generally the same as the members 17 at the ends of the frame 9.

The wheel-like structures 17 and 17a may be termed work supporting frame units. The frame 9 can be designated as the first frame unit and the members 17 and 17a can be considered portions of a second frame unit supported by the first frame unit 9. Each of the wheel-like frame members 17 and 17a is provided with a rectangular more or less central opening 18, and the vertical side portions defining said openings are provided with guides 19 upon which blocks 20 are slidably mounted. A detail of this structure is shown in Fig. 6. Beams 21 connect the sliding blocks 20, as shown in Figs. 1 and 3, and said beams are in turn connected to movable pistons 22 which are adapted to be raised and lowered by suitable hydraulic mechanism not shown.

Mounted between oppositely disposed pairs of sliding blocks 20 are threaded shafts 23, and upon said shafts are pairs of threaded nuts or work gripping members 24 which obviously can be moved longitudinally of the threaded rods 23 by turning them on said rods. Also extending between opposite pairs of sliding blocks 20 are work clamping members or supports 25 which, as best shown in Figs. 1 and 3, extend inwardly slightly beyond the threaded rods 23 but inside of the outer dimensions of the rotary nuts or work gripping members 24. The work clamping members 25 are provided to prevent pieces of work from engaging and mutilating the threaded rods 23. As shown in Fig. 1 each of the wheel-like work supporting frame members 17 and 17a is formed into upper and lower sections which are pivotally connected by means of a vertical pivot 26 shown at the right-hand side of the wheel-like member 17a in Fig. 1. At the left-hand side of said wheel 17a is indicated a locking pin 27 of any suitable design. Thus the top section of any of the members 17 and 17a can be swung on its vertical pivot 26 to open said members 17 and 17a to facilitate the placing of work pieces in position to be clamped by the threaded nut-like clamping members 24 on the threaded rods 23 and between said rods 23.

The center wheel-like supporting member 17a is provided with a ring gear 28 which extends about said member 17a adjacent its peripheral edges and said ring gear is meshed with pinions 29 mounted on the shaft of a motor 30.

As stated above, the apparatus is adaptable for use in the performance of numerous operations connected with the fabrication of structural units, etc. In the drawings, I have illustrated a tool holder in the form of a carrier for a welding head which is adapted to be moved relative to the work supporting frame units just described and the rotatable mounting for the welding head is such that it can be moved longitudinally transversely and vertically relative to the work supporting frame units. The use of the rotatable mounting for a welding unit movable on tracks attached to the mounting will permit welding to be performed in any direction.

At each end of the pit 8 is an inverted U-shaped stationary supporting guide member 31 which may be formed of heavy angle iron. Extending between the end posts 31 is a pair of track members 32 which, as shown in Figs. 1 through 4, is made of spaced parallel lengths of I-beam. The end of each I-beam 32 has a short vertical piece of angle iron 33 secured hereto and each of said pieces of angle iron 33 carries rollers 34 which are adapted to contact the inner faces of the vertical portions of the stationary supporting posts 31, thus permitting the trackway 32 to be raised and lowered relative to said end posts 31. A transverse member 35 extends between the I-beam forming the trackway 32 approximately midway between the ends of said I-beams. The transverse member 35 is connected by rods 36 to an upwardly disposed hydraulic ram 37 which in turn is supported by a post 38 having a horizontal portion 38a extending over the trackway 32. The transverse member 35 also has secured thereto by means of a cable 39 a counterweight 40. Actuation of the ram 37 obviously permits the trackway 32 to be raised and lowered relative to the stationary end guide posts 31. Trackway 32 has been located in the position of the guides 31 so that work may be placed in the frames 15, 15a without interference with any supporting members.

The right-hand portion of the trackway 32, as shown in Fig. 4, is adapted to receive rollers 41 which are secured to lugs 42, the latter in turn being connected to a rectangular frame generally designated at 43. The frame 43 extends laterally of the trackway 32 and lies over the work supporting frames 9, 17, and 17a. The left-hand side of the trackway, as viewed in Fig. 4, is provided with a rack 44 with which is meshed a pair of pinions 45, one of said pinions being mounted upon the shaft of a motor 46 which is suitably supported upon a plate 47 on one side of the frame 43. As a result, when the motor is actuated the frame 43 can be moved along the trackway 32.

The frame 43 is preferably formed of channel iron and is adapted to serve as a trackway to receive rollers 48 mounted on a small carriage 49. The carriage 49 has the lower cylindrical portion of a hydraulic ram 50 extending upwardly therethrough, and suspended from the upper end of said ram 50 is a pair of rods 51 which are forked at their lower ends, as shown best in Fig. 1, to support a carriage 52 from which is suspended a tool such as a welding head generally indicated at 53. The welding head 53 is secured to the underside of the platform 52 by a swivel connection shown at 54 in Figs. 1 and 3.

The carriage 49 which is mounted for movement longitudinally of the frame 43 upon its rollers 48 has a pair of screws 55 extending through its ends, as best indicated in Fig. 4. Said screws 55 are mounted for rotation between the left-hand end of the frame 43, as viewed in Fig. 4, and a transverse plate 56 which is spaced inwardly toward the right-hand end of said frame 43. As shown in Fig. 2, each of the screws 55 has a gear 57 secured thereto, and said gears are connected by an intermediate gear 58 driven by a motor 59 mounted upon a member 60 extending across the trackway 43. As a result the motor 59 is adapted to rotate the screws 55 in either direction to move the carriage 49, the hydraulic ram 50 and the platform 52 with its welding head 53 in a direction longitudinally of the frame 43 and transversely relative to the longitudinal axis of the work supporting frames 9, 17, and 17a.

In operation the tiltable work supporting frame 9 is normally in an initial position as shown in Fig. 3. The two wheel-like frames 17 and 17a are placed in desired positions longitudinally of the trackway 12 on the frame 9 depending upon the length of the piece of work to be operated upon. The hydraulic mechanism 22 is operated to move the threaded rods 23 and work supports 25 away from each other and said wheel-like frames 17 and 17a are swung open on their pivots 26 so that an elongated piece of work can be laid upon the lower work supports 25 on said wheel-like frames. The work is generally indicated by the letter W and is shown in dotted lines in Fig. 1 and Fig. 2. As best shown in Fig. 1, when the wheel-like frame units 17 and 17a are swung shut and the hydraulic mechanism 22 actuated to bring the work into contact with the upper work engaging members 25, as well as the lower members 25, the nut-like elements 24 on the threaded rods 23 can be manipulated to clamp the work between cooperating pairs of nuts 24. The work supporting frame units can then be tilted and/or rotated to bring the work to desired positions for performing operations thereon. For example, the two elongated angle iron sections of the work, as shown in Fig. 2, might be connected by a diagonal member and it is desirable to weld the members together with the line of weld in a horizontal position. Therefore, for a diagonal welding operation it would be necessary to tilt the entire work supporting apparatus about the pivots 10 and also to partially rotate the wheel-like frame units 17 and 17a. It is obvious that proper manipulation of the work supporting members or frames will enable the work to be positioned in any desired manner to permit welding along a horizontal line and where desired grooves or V openings are provided on the upper side of the work.

Due to the fact that welds or other operations must at times be performed longitudinally of the work supporting frames and transversely thereof, the welding head 53 is mounted upon its trackways 32 and 43 to provide for such movement. Also, due to the fact that the work supporting frames are tiltable and rotatable it is necessary to move the welding head 53 vertically to properly position said welding head relative to the work. For this reason I provide hydraulic rams 37 and 50 for raising and lowering the trackways 32 and 43 and said welding head 53.

One of the two wheel-like supporting members 17, as that one of the same shown at the right of Fig. 2, may be equipped with a ring gear 28a corresponding to the ring gear 28 meshing with a pinion 29a carried by the shaft of a motor 30a carried by the adjacent bearing member 15. Both motors 30 and 30a are, of course, reversible motors. When one of the motors 30 or 30a is alone operated without the other motor being operated all three of the work holding members 17 and 17a will rotate together. However, if it is desired to twist the work as to straighten or shape the same, the two motors 30 and 30a can rotate in opposite directions to produce a desired twist to the work.

With work clamped and supported between two of the annular wheel-like members 17 or 17a the clamping bars 23 of one of the members can be hydraulically raised or lowered as a unit relative to the other. In other words, the nuts 24 mounted on the threaded members 23 serve not only as clamps which can be moved toward each other to grip work between them, but can be shifted in the plane of the wheel-like supporting frame as a unit so that the work can be raised or lowered while clamped in order to properly position it and also in order to perform bending or straightening operations. This shifting of the threaded members 23 and the nuts 24 simultaneously and in the same direction can, of course, be at any angle in the plane of its wheel-like frame since the latter is rotatable. This provides apparatus of extreme flexibility which is capable of a great number of assembling, forming and general holding operations. Attention should also be called to the fact that after one of the wheel-like members 17 or 17a has been raised relative to the others, the work can be given a twist through rotation of the motors 30 and 30a in opposite directions.

As a result of the numerous positions to which the work holder can be put and the maneuverability of the welding head 53 relative to the work supporting frames, it is possible to produce numerous operations on various types, sizes and shapes of work.

The platform 52 which supports the welding head 53 is designed to serve as a movable support for an operator performing the welding or fabricating operations, and regardless of the angular position of the work relative to a horizontal plane the operator is suspended above the work and immediately adjacent thereto on said platform 52 which is maintained in a horizontal plane.

It will, of course, be understood that various changes may be made in the form, details, arrangement, and proportions of the various parts without departing from the scope of my invention.

What I claim is:

1. Work holding and fabricating apparatus comprising an elongated frame including a longitudinally extending trackway, pivot means intermediate the length of said frame mounting the frame for vertical tilting movements to adjusted positions, means for tilting said frame and holding the same in adjusted positions, arcuate guideway members disposed transversely of said frame and shiftable along said trackway to adjusted positions, an annular work holding member carried by each guideway member and rotatable thereon transversely of the frame to adjusted positions, each of said annular work holding members having a concentric work receiving open area, and work clamping elements carried by said work holding members.

2. Work holding and fabricating apparatus comprising an elongated frame including a longitudinally extending trackway, pivot means intermediate the length of said frame mounting the frame for vertical tilting movements to adjusted positions, means for tilting said frame and holding the same in adjusted positions, arcuate guideway members disposed transversely of said frame and shiftable along said trackway to adjusted positions, an annular work holding member carried by each guideway member and rotatable thereon transversely of the frame to adjusted positions, each of said annular work holding members having a concentric work receiving open area, work clamping elements carried by said work holding members, and means for individually turning the work holding members to adjusted positions.

3. Work holding and fabricating apparatus comprising an elongated frame including a longitudinally extending trackway, pivot means intermediate the length of said frame mounting the frame for vertical tilting movements to adjusted positions, means for tilting said frame and holding the same in adjusted positions, arcuate guideway members disposed transversely of said frame and shiftable along said trackway to adjusted positions, an annular work holding member carried by each guideway member and rotatable thereon transversely of the frame to adjusted positions, work clamping elements carried by said work holding members, an overhead track extending longitudinally of said frame in spaced relation to one side thereof, a support movable along the overhead track and extending laterally therefrom over said frame, a carriage movable along said support transversely of said frame, and a tool holder suspended from said carriage and moving therewith into operating relation to portions of work carried by the work holding members.

4. Work holding and fabricating apparatus comprising an elongated frame including a longitudinally extending trackway, pivot means intermediate the length of said frame mounting the frame for vertical tilting movements to adjusted positions, means for tilting said frame and holding the same in adjusted positions, arcuate guideway members disposed transversely of said frame and shiftable along said trackway to adjusted positions, an annular work holding member carried by each guideway member and rotatable thereon transversely of the frame to adjusted positions, work clamping elements carried by said work holding members, an overhead track extending longitudinally of said frame in spaced relation thereto, and a support movable along the overhead track, a carriage movable along said support transversely of the frame, and a welding device carried by said support.

5. The structure of claim 1 wherein each work holding member has its work receiving area in the form of an opening extending diametrically of the work holding member and having upper and lower side edges and end edges, threaded shafts extending longitudinally in said opening between end edges thereof, blocks slidable along the said end edges and rotatably supporting the threaded shafts, nuts threaded upon said shafts, work-engaging bars extending longitudinally of said shafts in laterally spaced relation thereto and secured at their ends to said blocks, and adjusting members carried by said work supporting member and connected with said bars and serving to move the bars and the blocks carrying the bars along the said end edges of the opening into and out of a work gripping position.

6. The structure of claim 1, wherein each work holding member has its work receiving area in the form of an opening extending diametrically of the work holding member and having upper and lower side edges and end edges, threaded shafts extending longitudinally in said opening between end edges thereof, blocks slidable along the said end edges and rotatably supporting the threaded shafts, and nuts threaded upon said shafts for movement along the shafts to adjusted positions, adjusting members carried by said work supporting member and connected with said blocks and serving to shift the blocks and the shafts along the said end edges of the opening to adjusted positions.

7. The structure of claim 1 wherein each work holding member has its work receiving area in the form of an opening extending diametrically of the work holding member and having upper and lower side edges and end edges, threaded shafts extending longitudinally in said opening between end edges thereof, work grippers in the work receiving opening slidable along the said end edges toward and away from each other into and out of position for gripping work between them, and means carried by said work holding member for moving the work grippers into and out of a gripping position.

8. Work holding and fabricating apparatus comprising an elongated frame, pivot means intermediate the length of said frame mounting the frame for vertical tilting movements to adjusted positions, means for tilting said frame and holding the same in adjusted positions, guide means extending longitudinally of the frame, arcuate guideway members shiftable along said guide means longtiudinally of the frame and disposed transversely of said frame at various positions along its length, an annular work holding member carried by each guideway member and rotatable thereon transversely of the frame to adjusted positions, each of said annular work holding members having a concentric work-receiving open area, and work clamping elements carried by said work holding members.

9. Work holding and fabricating apparatus comprising an elongated frame, pivot means intermediate the length of said frame mounting the frame for vertical tilting movements to adjusted positions, means for tilting said frame and holding the same in adjusted positions, support members mounted on said frame and disposed transversely of said frame at various positions along its length, an annular work holding member carried by each support member and rotatable thereon transversely of the frame to adjusted positions, work clamping elements carried by said work holding members, an overhead track extending longitudinally of said frame in spaced relation to one side thereof, a support movable along the overhead track and extending laterally therefrom over said frames, a carriage movable along said last mentioned support transversely of said frame, and a tool holder mounted on said carriage and moving therewith into working position for a tool to be held thereby relative to portions of work carried by the work holding members.

References Cited in the file of this patent

UNITED STATES PATENTS

| Number | Name | Date |
|---|---|---|
| 322,437 | Gaston | July 21, 1885 |
| 1,105,188 | Dodge | July 28, 1914 |
| 1,335,721 | Bergstrom | Apr. 6, 1920 |
| 1,490,608 | Gilmour | Apr. 15, 1924 |
| 2,095,964 | Blickman | Oct. 19, 1937 |
| 2,227,688 | Wood | Jan. 7, 1941 |
| 2,229,517 | Nighthart et al. | Jan. 21, 1941 |
| 2,320,079 | Hartwig | May 25, 1943 |
| 2,342,025 | Watter | Feb. 15, 1944 |
| 2,354,794 | Buehler | Aug. 1, 1944 |
| 2,359,249 | Scheer | Sept. 26, 1944 |
| 2,414,549 | Nowak | Jan. 21, 1947 |
| 2,445,016 | Bentley | July 13, 1948 |
| 2,477,169 | Brekelbaum | July 26, 1949 |
| 2,483,811 | Cullen | Oct. 4, 1949 |